July 11, 1944.  J. H. WILLIAMS  2,353,532
APPARATUS FOR MAKING GLASS BUILDING BLOCKS
Filed Dec. 20, 1937    3 Sheets-Sheet 1

July 11, 1944.  J. H. WILLIAMS  2,353,532
APPARATUS FOR MAKING GLASS BUILDING BLOCKS
Filed Dec. 20, 1937  3 Sheets-Sheet 3

INVENTOR:
Josiah H. Williams,
BY
ATTORNEY.

Patented July 11, 1944

2,353,532

UNITED STATES PATENT OFFICE 2,353,532

APPARATUS FOR MAKING GLASS BUILDING BLOCKS

Josiah H. Williams, Baltimore, Md.

Application December 20, 1937, Serial No. 180,875

9 Claims. (Cl. 49—5)

This invention relates to an apparatus for making glass building blocks, particularly hollow glass building blocks, and similar glass articles.

In the manufacture of hollow glass building bricks or blocks of the class to which my invention relates, it has been the general practice to mold half sections of the blocks, and, after removal of such half sections from their molds, to either cement or to weld the mating surfaces of two half block sections together to form a block unit. Such block sections to be united are usually one or both recessed to provide in the formed block a chamber or cavity in which a partial vacuum may be produced after the block is formed by exhausting air from the block and then sealing the opening through which the air is exhausted, or by exhaust of air during the step of uniting the block sections, due to the cooling and rarefaction of the previously heated air contained in the recess or recesses and confined in the closed chamber or cavity formed thereby by the sealing action when the block sections are united.

These block sections formed in the manner described cool to a more or less extent from exposure on their removal from the molds and must be reheated to a greater or less extent at least at the surfaces to be welded in order that they may be of a proper temperature to be united by the kind of cement employed or of a proper temperature and plasticity for a welding union. The glass charges of which these half blocks are formed may be drawn by different means or at different times from a glass source, or drawn from different glass sources, and there may be a greater or less interval of time after block sections are formed before they are united. Blocks so made are therefore very liable to be formed of sections which are imperfectly heated for proper union, or non-uniformly heated at the time of union, unduly delayed in annealing, or formed of glass portions of different stratification or coefficiencies of expansion and contraction, so that they are liable to fracture while being handled or in service, with resulting large losses due to imperfect manufacture or breakage. Blocks so formed are also liable to imperfections or structural differences obscuring or preventing good insulating properties and good light transmission or diffusion, which it is desirable such blocks should have. In addition, owing to the number of steps required in the manufacture of glass bricks or blocks as customarily made the cost of manufacture is comparatively high. This high cost of manufacture, plus losses due to waste and imperfect block produced, and structural weaknesses of the blocks produced from the causes mentioned, are factors of importance to manufacturers as constituting obstacles to the production of satisfactory blocks and use of such blocks on a more extensive scale.

Another serious disadvantage to the manufacture of hollow glass blocks formed of sections united at a high temperature by cementing or welding is the great difficulty in making the blocks vacuum tight or proof against the entrance of air and foreign substances. When two such highly heated block sections are brought together for the purpose of uniting the mating surfaces by cementing or fusion, the air confined in and between the block sections and expanded by the heat thereof seeks to escape and blows out between the mating surfaces, frequently causing irregularities in the mating surfaces preventing the formation of a perfect joint or producing in the formed block at or in the region of the joint small crevices or pin holes not sealed in the cementing or welding action. When such pin holes or crevices exist air will be allowed to enter the block, thus preventing the formation or maintenance of a vacuum therein, and dust and other impurities by aspiration or otherwise will enter the block to soil or discolor the interior of the block and to interfere with its light transmitting or diffusing properties.

One object of my invention is to provide an apparatus whereby such half blocks may be formed and united to produce complete blocks without resulting objections of such character.

Another object of my invention is to provide an apparatus whereby such half blocks may be formed and united in a ready, expeditious and economical manner.

Still another object of my invention is to provide an apparatus whereby hollow building blocks or other articles of fine quality and good insulating and light transmitting qualities, and which are not easily subject to fracture, may be easily and quickly produced.

Still another object of my invention is to provide an apparatus by means of which perfectly formed half blocks to be united may be simultaneously produced from glass of the same temperature and quality, whereby two such blocks may be accurately joined, and whereby reheating and other steps of manufacture commonly employed may be dispensed with.

Still another object of the invention is to provide an apparatus whereby the half block sections as formed in the molds may be accurately positioned relative to each other and welded together while still in the molds without previous removal therefrom by proper relative movement of the molds toward each other, and the formed block released from the molds without liability of injury thereto by proper relative movement of the molds away from each other.

Still another object of my invention is to provide a method by which the mating surfaces of block sections may be fused together in such a manner as to ensure the production of a strong and tight joint, absolutely sealed against the entrance of air and dust or other foreign substances.

Still another object of the invention is to provide a simple, easily operated and inexpensive type of apparatus for carrying the invention into practical effect.

In the accompanying drawings exemplificatively showing one means for carrying the method into practice—

Fig. 5 is a view showing the molds swung to vertical position and the relative position they occupy at the beginning of their horizontal travel toward each other to unite the block sections, such position being also the position they occupy when slid apart horizontally after formation of the block to release the block.

Fig. 5a is a section on line 5a—5a of Fig. 1.

Figure 1:
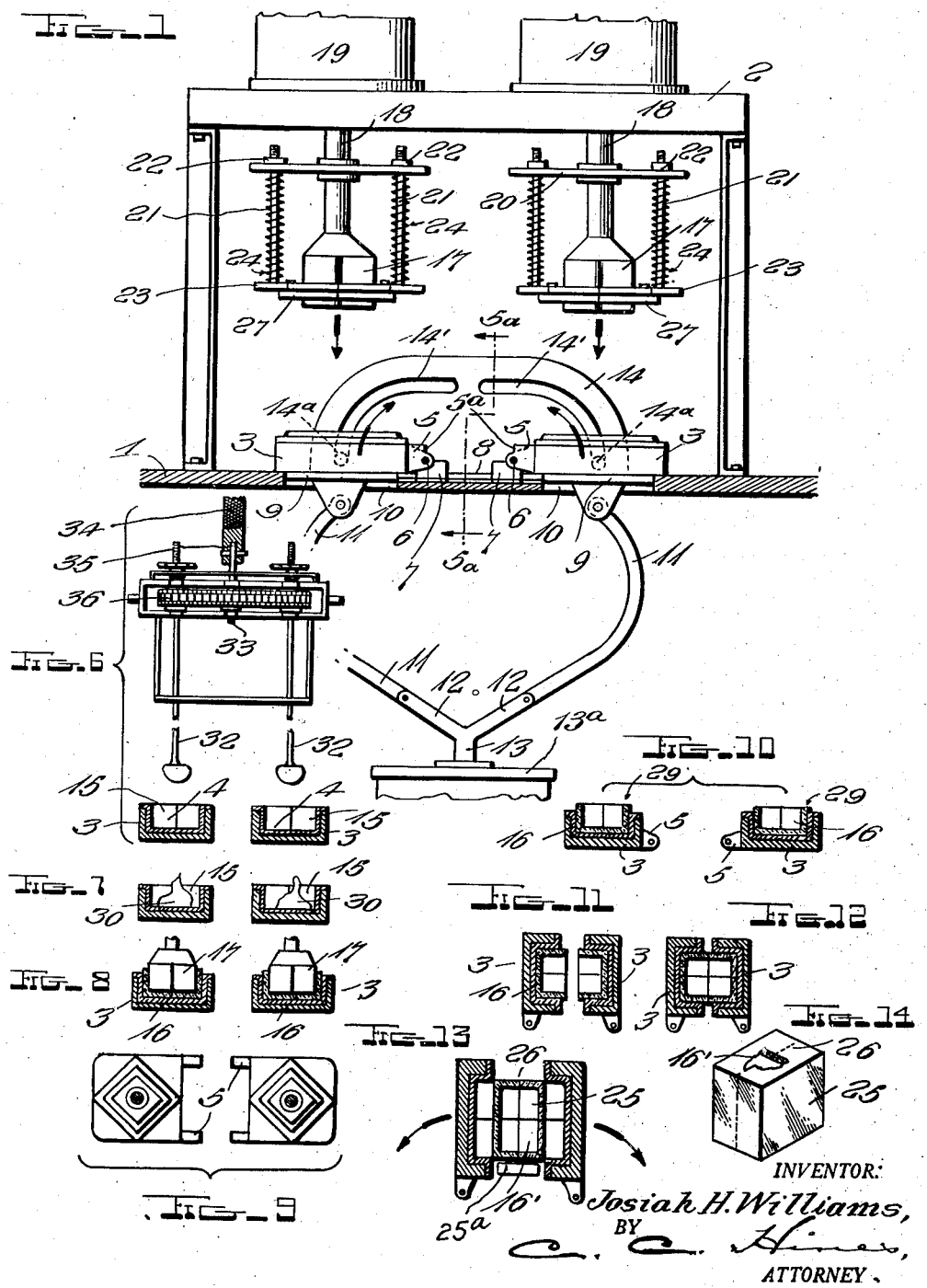
Fig. 1 is a view in front elevation of the forming apparatus, showing the forming molds in normal or receiving position and the forming plungers retracted.

Figs. 6 to 13, inclusive, are schematic views illustrating the steps of the method.

Fig. 14 is a perspective view of one of the completed blocks, a part of the block being shown broken away.

The apparatus shown herein for carrying the invention into practice comprises a frame having a lower supporting portion or table 1 and an upper supporting portion 2. Mounted on the lower supporting portion or table 1 are two opposed and adjacently disposed mold holders 3 each adapted to receive a mold 4, which molds may be generally of counterpart character for the formation of generally similar half block sections. Each holder 3 is provided with a mold receiving chamber or cavity open at its top or upper side to permit of the introduction and removal of the mold 4 designed to be fitted therein, which mold is preferably of somewhat greater depth than the depth of the holder chamber. Suitable means may be provided in practice to removably secure each mold in its holder and to enable each mold to be applied, removed and handled with facility, such for example as a manipulating device adapted to be removably engaged with the mold. By this means molds with different sizes and shapes of forming cavities may be interchangeably used in connection with the same holders for the production of blocks varying in size, form and appearance or external configuration.

The mold holders 3 are provided upon their walls which lie opposite each other when the molds are arranged in horizontal charge receiving position with lugs or projections 5 terminating in hinge knuckles or eyes by which they are pivotally connected by pintle rods or shafts 6 with hinge knuckles or eyes on supporting blocks or carriages 7 slidable toward and from each other in guideways 8 on the table. By this arrangement the holders and molds therein are mounted to have compound swinging and sliding movements from a horizontal charge receiving position shown in Figs. 1, 2 and 6 to a vertical compressing or half blocks uniting position shown in Figs. 3 and 12, as more particularly hereinafter described. The backs of the holders 3 are provided with ribs or projections 9 to snugly fit within receiving and guide openings 10 in the table when supporting the molds in charge receiving position, whereby the molds are firmly backed and held from any possibility of horizontally shifting during charging and molding actions. The mold holders and molds may be moved between the positions described by any suitable type of actuating mechanism, that shown in the present instance comprising curved link members 11 normally arranged beneath the table and attached at their upper ends to the mold holders and at their lower ends to the diverging or fork arms 12 of an actuating rod 13. This rod 13 may receive motion from any suitable operating means, but is indicated in the present instance as forming a piston rod which may be connected to a piston head operating in a cylinder 13ª. This conveniently may be a compressed air cylinder supplied with compressed air from any suitable source, the supply and exhaust of air being controlled in practice by suitable valve mechanism whereby the up and down movements of the piston in the cylinder may be controlled. On their upward and downward movements the links 11 move through the guide openings 10 to move the mold holders from charging and molding position to compressing position, and vice versa. To allow greater ease of operation with less power in these actions the weight of the mold holders and molds may be suitably counterbalanced by counterbalancing means applied to the mold holders or pintle shafts. Suitable guiding means for guiding the mold holders in their movements may also be provided, that shown in the present instance for the purpose comprising a rigid guide plate 14 fixed to the table at one side of the mold holders and provided with a grooved or slotted guideway 14' to receive guide pins or projections 14a on the mold holders. These guide elements may be duplicated at the opposite side of the mold holders if desired.

The mold holders when moved upwardly to compressing position will have a preliminary traverse and a final traverse. In their preliminary traverse upwardly the holders will swing for the greater portion of their movement through an arc on their pintles from the horizontal position shown in Figs. 1 and 2 to a vertical gaging position shown in Fig. 5, whereby the half block sections in the molds are centered for accurate alinement and engagement of their surfaces to be welded. From this point the holders will have a final traverse in which the vertical translatory motion of the links is converted in horizontal motion of the mold holders on and with the sliding blocks 7, on which movement the molds are brought to the compressing position shown in Fig. 3, ensuring a straight horizontal compressing action and an accurate welding of the opposed surfaces of the half block sections under more or less pressure. On the downward motion of the links the holders and molds will move in reverse order to that above described, that is to say, the holders will have a preliminary outward or separating traverse back from the position shown in Fig. 3 to that shown in Fig. 5, followed by an arcuate swinging movement and return to horizontal position. The effect of this horizontal preliminary traverse of the holders on retraction is to allow the molds to move apart on a straight line a sufficient distance to completely release the welded block, thus providing for release of the block without liability of injury thereto. Each mold 4 has a cavity 15 therein of a suitable shape to form a half block 16. These half blocks are designed to be formed in the mold cavities by forming plungers 17 carried by rods 18 connected to pistons operating in cylinders 19 mounted on the upper frame portion 2. The pistons may be operated by compressed air or other fluid under pressure, as is common in molding apparatus of this type. Each plunger rod 18 has fixed thereto a supporting disk or head 20 which is apertured for passage therethrough of sliding rods or bolts 21 limited in downward movement by nuts or stop members 22 and fixedly carrying at their lower ends a cover plate or head 23 which is apertured for the passage of the plunger 17 and is designed to cover the open top of the mold, except for the opening through which the plunger is movable, during the molding or pressing action. Encircling the rods 21 are coiled springs 24 which when the head 23 comes in contact with the top of the mold on the descent of the plunger allow the head 20 to descend with the plunger as the latter moves into the mold chamber, during which the springs are placed under tension to return the head 23 to normal position at the close of the molding operation and movement of the plunger upward to its normally retracted position. The hinge knuckles 5 are provided with abutment surfaces 5a to rest on the blocks 7 when the molds are swung to vertical positions, whereby the swinging movements of the molds are limited and their further swinging movements beyond the vertical are prevented when the molds are brought to parallel vertical positions, in which they are spaced apart a predetermined distance by the spacing of the blocks 7, and whereby they are adapted to be stably supported on the blocks 7 for sliding movements therewith.

Each half block 16, as shown, is formed of an outer or face wall and boundary walls enclosing a cavity therein which is open on the side of the half block opposite the face wall. Two such half blocks when formed are designed to be disposed with their open sides facing each other and then to be brought together, while in a suitably plastic condition, so that the edge portions of their walls at their open sides will be united by fusion under suitable pressure to produce the complete hollow block 25 shown in Fig. 14, in which 26 indicates the fused joint between the block sections. This complete block, which may be of rectangular, oblong rectangular or other suitable form, has the face walls of the block sections of which it has been formed facing in opposite directions and the block is provided with a closed chamber or cavity 16'. This chamber or cavity may be partly evacuated, that is to say, contain dry, rarefied air, due to cooling and rarefaction of the air after the block sections are united, or otherwise produced, so as to give the block good light transmitting and thermal insulating properties. In addition, the faces of the block may be suitably ornamented and provided with light diffusing or other light controlling or transmitting surfaces, and the walls of the block between its faces may be provided with any desired or preferred type of bonding surface.

Figure 2:
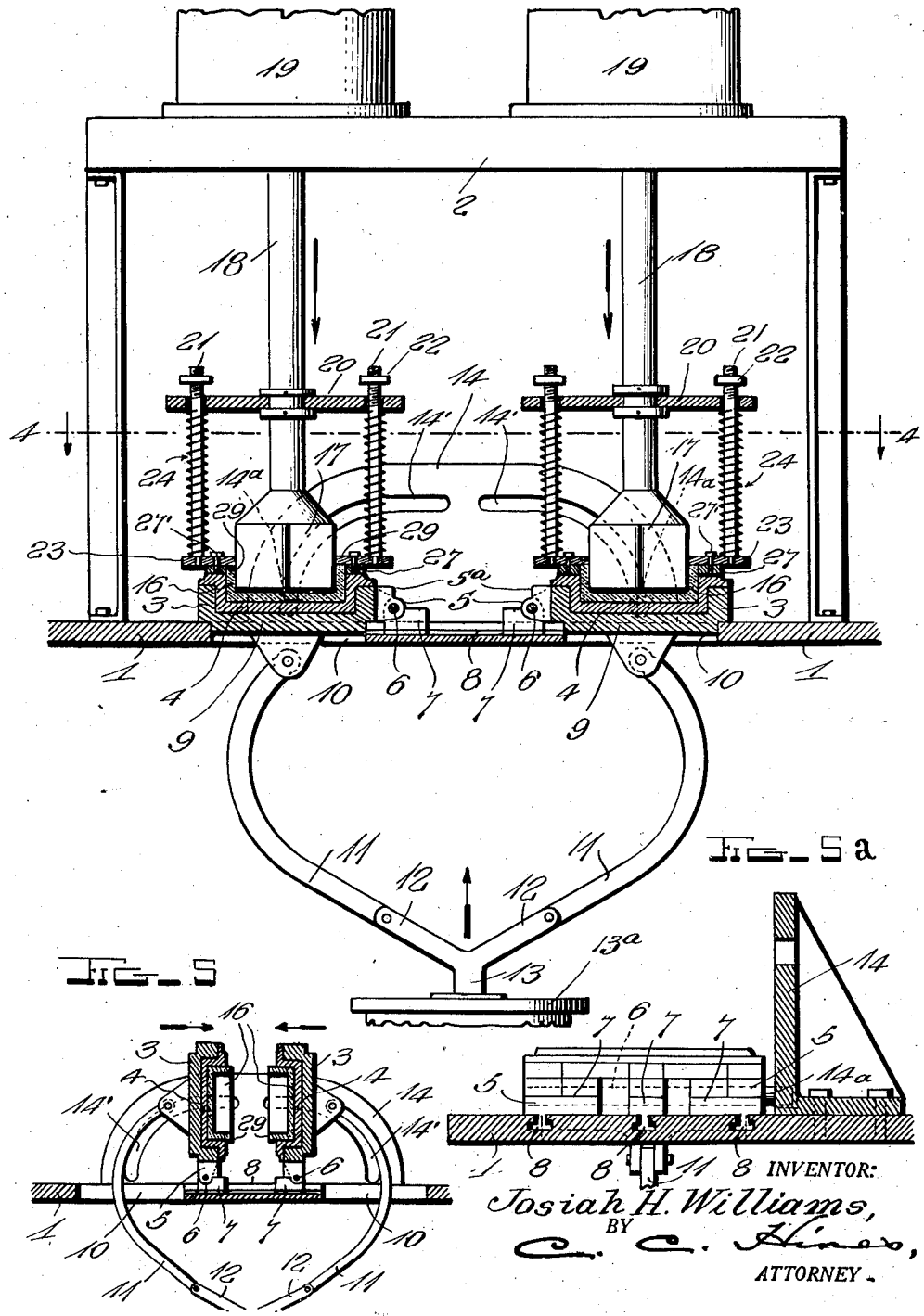
Fig. 2 is a similar view, with parts in section, showing the simultaneous pressing action.
Figure 3:
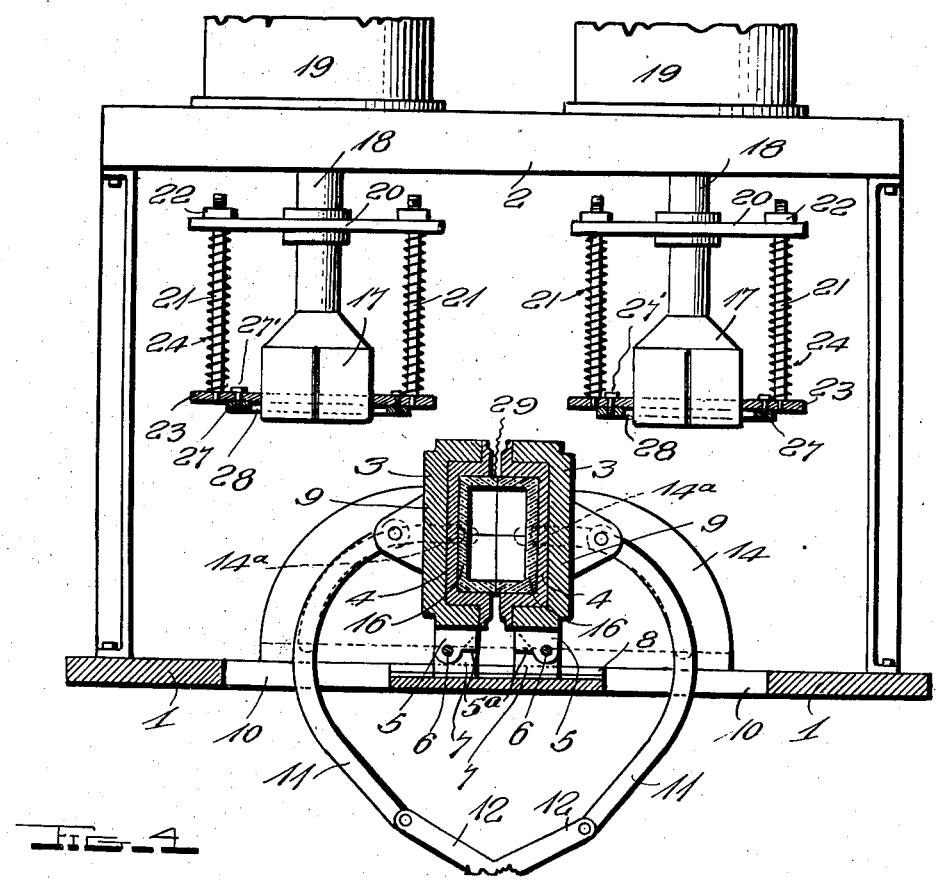
Fig. 3 is a view similar to Figs. 1 and 2 showing the molds swung upwardly to block sections uniting position.
Figure 4:
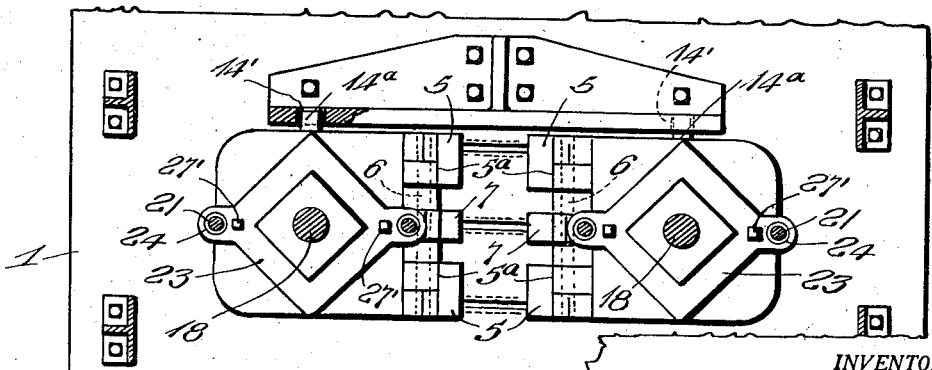
Fig. 4 is a section on line 4—4 of Fig. 2.

It will be understood that after the molds disposed in the receiving position shown in Fig. 1 are supplied with charges of glass, in which position the molds rest solidly upon the supporting table 1, the plungers 17 are operated to cause them to enter the molds and to simultaneously form in said molds two half block sections to be united. Upon the retraction of the plungers 17 the molds are then swung upwardly through an arc on a preliminary traverse to the vertical position shown in Figs. 5 and 11, thus bringing the open sides of the molds opposite each other and the mating surfaces of the block sections therein into accurate registry and in such position relative to each other than on a final horizontal traverse of the molds toward each other such surfaces, i. e., the edges of the walls at the open sides of the block sections, will be brought in contact, as shown in Figs. 3 and 12 and united under suitable pressure so as to cause a homogeneous bond between them. A complete block is thus produced which will be automatically stripped or separated from the molds upon the preliminary horizontal outward movement of the molds relative to each other back from the position shown in Figs. 3 and 12 to that shown in Figs. 5 and 11, prior to their arcuate swing back to their normal receiving position. As the molds separate the block is exposed and may be suitably sustained in position and supported during its period of release by suitable supporting and handling means 25a. The supporting and handling means may be a pair of hand tongs or may comprise a plate or paddle held, as shown in Fig. 13, under the block to support the same while the mold sections are being opened or moved apart. The formed block may then be submitted to annealing and any other actions necessary to prepare it for commercial sale and for use.

In order to ensure the reliable and certain fusion of the block sections together, each mold chamber 15 is made of a depth less than the depth of the half section 16 which is to be formed therein and provision is made in the form of a neck ring 27 on the plate 23 for the production of a forming recess 28 about the forming plunger at the forming period whereby the boundary walls of the block section at the open side thereof will be projected beyond the mold face in the form of welding extensions 29 continuous with and projecting outwardly in the planes of the mold walls. Thus when the plunger 17 and neck rings 27 are retracted the portions 29 of the formed half sections in the mold will project beyond the faces of the mold, as clearly shown in Fig. 2, so that they may be brought together to unite the welding extensions under any degree of movement or compression required or found to be necessary in this operation. By this means any possible forming irregularities or variations in the surfaces of the half blocks to be joined may be compensated for and the block sections compressed or squeezed together to any extent necessary to effect their absolute and perfect welding union. An advantage accruing from this method of forming and joining the half block sections is that such sections may not only be joined while the half sections are still in the molds, but at a time while they are still heated to a sufficiently high degree and are of a properly plastic state to be fused together without further or additional heating. A still further advantage accruing from this method of forming and joining the block sections is that while the enclosed portions of the block sections will be cooled down by abstraction of heat therefrom by the mold and holder walls, the projecting portions 29 of the block sections will be at a higher heat and degree of plasticity or may be readily heated by auxiliary heating means if desired so that they may be joined in the most effective manner by bringing them together under suitable pressure to homogeneously unite the block sections and to form a joint proof against the leakage of air into the vacuum space so that a high vacuum therein may be maintained. It will be understood, of course, that the walls of the mold chamber and walls of the block sections formed thereby are suitably shaped in practice to facilitate separation of the molds from the formed block during movement of the molds apart at the close of a block forming action. The neck ring 27 is detachably secured in position by screws or other fastening means 27' so that neck rings of different sizes or forming shapes may be used in forming different sized or specifically different shaped articles. A still further advantage of so forming the block sections of greater depths than the mold cavities and mounting the molds for the sliding movements described is that the depths of the mold cavities for forming any particular sized block may be decreased and the molds correspondingly reduced in size and weight, allowing them to be operated with greater ease and facility.

It is desirable to form the half block sections in the molds in such manner as to avoid any tendency to sagging of block walls when the molds are turned to vertical position. If the cavities in the molds are so arranged, for example, that two of the block sides are vertical and the other block sides horizontal when the mold is turned to a vertical position, there may be a tendency of the uppermost horizontally disposed walls of the half blocks to sag under their weight while still in a plastic condition, thus forming half blocks which are not absolutely true and which might cause difficulty in joining two such half blocks together. In order to automatically avoid this objection I dispose the cavities in the molds so that the half blocks will be formed in a cornerwise manner, that is, so that the sides of the block sections will be inclined at oblique angles to the vertical when the molds are brought from a forming to an upright position. These inclined walls thus act to mutually stay or brace each other and to prevent sagging of the boundary walls of the block sections. Block sections of absolutely true shape may thus be formed whose surfaces will be absolutely in alinement for fusion when the block sections are brought together.

Figs. 6 to 11, inclusive, show schematically the method of forming and uniting two block sections to form a block of the structure shown in Fig. 12. In the first operation shown in Fig. 6 two gobs or gathers 30 of glass of the proper amount are deposited in the mold chamber 15, into which said gobs or gathers settle as shown in Fig. 7. Fig. 8 shows the forming step by the action of the plungers and neck ring whereby the two half block sections are simultaneously formed in the molds. Fig. 9 is a plan view and Fig. 10 is a sectional view showing the plungers withdrawn and the half blocks as formed in the molds in readiness to be united. It will be observed that these block sections are provided with fusing portions or projections 29 extending beyond the open sides or mouths of the mold. Fig. 11 shows the molds swung upwardly on their initial traverse to vertical position to bring the projections 29 of the block sections into accurate register and in readiness to be united by fusion or while they are still in a plastic condition on the final horizontal traverse of the molds to the welding position shown in Fig. 12. Fig. 13 shows the outward horizontal movement of the molds to block releasing position allowing the block to be removed without injury therefrom. Fig. 14 shows the completed block removed from the molds. It will be obvious that by this manner of forming and uniting the block sections the necessity of reheating the block sections, with its attendant disadvantages is rendered unnecessary and the number of steps of manufacture reduced, while at the same time a superior type of block is produced.

In gathering the gobs 30 and feeding the molds, I preferably provide means in the form of a unitary gathering device for simultaneously gathering two gobs and simultaneously depositing said gobs in two forming and compressing molds. The means employed for this purpose as shown comprises a gathering tool comprising a pair of punties 32 arranged in parallel relation to each other and in properly spaced relation and mounted upon a carrier head or support 33 in which the punties are journaled for rotation. The punties are adapted to be manipulated by means of a pilot handle 34 arranged on or forming part of a shaft 35 coupled by suitable gearing 36 to the punties 32 whereby the latter may be properly rotated during the gathering action. The multiple gatherer here shown may be a two punty type of gathering tool of the general structure disclosed in my applications Serial Nos. 154,662, now Patent No. 2,247,424, granted July 1, 1941, and 167,047, now Patent No. 2,250,515, granted July 29, 1941, or of any other suitable type. While other gathering means for the purpose may be employed, and while the charges may be gathered separately from the same or different sources of supply, it will be seen that by the use of this gatherer charges of glass of exactly the same consistency, temperature and other conditions may be gathered at the same time and simultaneously deposited into the molds, thus charging the molds with glass not only of the same temperature but of other essential characteristics for the production at one and the same time of two half block sections to be joined which will be formed of glass of identical qualities. The resulting block formed from these half block sections will therefore be composed of portions of glass of like coefficiencies of expansion and contraction and of equal degrees of strength. Such a block will be of uniform wall thickness, better light transmitting and diffusion qualities, and less liable to fracture under expansion, contraction and other stresses than blocks formed in the ordinary way. I do not, however, desire to be confined to this particular method of charging the molds or to the use of such particular tool, except when expressly confined thereto in particular claims.

It may be desirable under some conditions to exert a heavy squeezing pressure on the formed half blocks, after the molds have been moved to vertical or half-block uniting position, in order that the block surfaces 29 may be pressed together to close all possible voids and to ensure the formation of an absolutely homogeneous and compactly welded joint. The horizontal traverse of the molds in the welding action allows this to be done and any desired amount of squeezing pressure to be exerted by varying the extent of this traverse, either through controlling the range of movement of the piston in cylinder 14 or by using a fixed range of piston motion and providing means for adjusting and varying the effective length of the piston rod 13, for which purpose said rod may be formed of sections adjustably coupled together.

In practice, one or two pairs of molds, each in association with a press, may be advantageously used on each side of the gathering opening, i. e., one pair at each side of the platform on which the feeder operator or operators stand which pairs may be alternately and successively supplied with glass charges. Thus in the case of the use of a pair of molds at each side of the platform fed by a feeder controlled by a single workman, while the workman is gathering and feeding charges to one pair of molds, the block which has been formed in the previously charged molds may be allowed to cool in the molds to a temperature suitable for annealing. By this means production speed may be increased, as one block may be formed and be allowed to cool to a most advantageous temperature for annealing in one pair of molds while the steps of charging the other pair of molds and forming another block therein are being carried out. This will allow ample time for a block to cool within its molds to such degree as to prevent its distortion from its molded shape which would occur if the block were removed too soon, whereby blocks of proper shape and of a uniform temperature suitable for annealing may be produced, which is impossible where the half sections are formed at intervals apart and united by other molds. It is also to be understood that two pairs of molds and presses may be placed at each side of the platform, in which event two feeder operators gathering and feeding alternately may be employed, one to feed the molds at one side of the platform and the other to feed the molds at the opposite side of the platform, each workman feeding one pair of molds while the articles formed are preliminarily cooling in the other pair of molds of the same set. With such arrangement of molds and presses constant feed and molding actions without loss of time between them is possible. It will, however, be understood that other suitable methods of and means for feeding glass to the molds may be employed.

Other advantages of the invention reside in the inexpensive construction of the molds, as sectional molds with hinges are unnecessary. The molds may also be of one-piece type, or formed of plates or half sections, which may be easily placed in or removed from the mold holders. This permits of the formation and use of molds of different sizes, styles or designs formed of interchangeable sections, and which may be fitted in the same holders, thereby eliminating the expense of a plant carrying a complete complement of individual molds of different sizes, styles and designs, as required in customary practice.

From the foregoing description, taken in connection with the drawings, my improved apparatus for making glass building blocks of the character described will be readily understood and it will be seen that the invention provides an apparatus whereby hollow glass blocks of superior qualities may be easily, quickly and economically made. It will further be seen that the invention provides a simple, easily operated and efficient type of apparatus for carrying the invention into practical effect.

While the construction of apparatus herein disclosed is preferred, it will, of course, be understood that modifications of the steps and changes in the form, proportions and construction of parts of the apparatus may be made within the scope of the appended claims without departing from the spirit or sacrificing any of the advantages of the invention.

What I claim is:

1. An apparatus for making a hollow glass block formed of sections joined together comprising a pair of molds having forming cavities therein for the reception of glass charges from which the article sections are to be pressed, said molds being normally arranged horizontally side by side in spaced relation to each other with the mouths of the mold cavities opening through their normally upper sides for the reception of the glass charges and the pressing of the same therein, normally spaced sliding mold supporting members slidable toward and from each other, means pivotally connecting adjacent sides of the molds to the sliding supporting members, whereby the molds may be swung from their normal horizontal positions to vertical positions resting on the members for sliding movements therewith, and operating means for swinging the molds and sliding the molds and supporting members.

2. An apparatus for making a hollow glass block or the like article formed of sections joined together comprising a pair of molds having forming cavities therein for the reception of glass charges from which the article sections are to be pressed, said molds being normally arranged horizontally side by side in spaced relation to each other with the mouths of the mold cavities opening through their normally upper sides for the reception of the glass charges and the pressing of the same therein, supporting means mounting the molds for sliding movements in a horizontal plane toward and from each other and pivotally mounting the molds for swinging movements from their horizontal positions to spaced vertical positions and vice versa, from and toward which the vertically disposed molds are slidably movable, a power operated member having opposite working strokes, and links connecting said member to the molds and movable by and in one stroke direction of the member to first swing the molds upwardly to spaced apart vertical positions and then slide them horizontally toward each other to bring the edges of the article sections into contact and movable by and in the other stroke direction of the member to first slide the molds horizontally apart for the release of the formed article and then swing the molds back to horizontal position.

3. An apparatus for making a hollow glass block or like article formed of sections joined together comprising a pair of molds having forming cavities therein for the reception of glass charges from which the article sections are to be pressed, said molds being normally arranged horizontally side by side in spaced relation to each other with the mouths of the mold cavities opening through their normally upper sides for the reception of the glass charges and the pressing of the same therein, a supporting table on which the molds rest when in their horizontal positions, normally spaced supporting members on the table slidable horizontally toward and from each other, means pivotally connecting adjacent sides of the molds to the respective sliding supporting members, said members and pivotal connections mounting the molds for sliding movements toward and from each other and for swinging movements from their normal horizontal positions to parallel vertical positions and vice versa, operating means coupled to the molds for swinging them upwardly to vertical positions on their pivotal connections and then sliding them toward each other with said supporting members, said operating means being operable to reverse such order of movements of the molds and supports.

4. In an apparatus for making hollow glass blocks or like articles formed of sections joined together, the combination of a pair of spaced normally horizontally disposed molds in which the article sections are formed, a pair of normally spaced horizontal supports disposed between the molds and slidable toward and from each other, means pivotally connecting the respective molds at their adjacent sides to the respective supports to adapt the molds to be swung upwardly from their normal horizontal positions to vertical positions, and vice versa, in which vertical positions the molds are brought to rest upon the supports for sliding travel therewith, the spacing of the supports being such that in their vertically disposed positions the molds and surfaces of the formed article sections therein which are to be joined are spaced apart and said surfaces of the article sections brought into position for a registering action and to join them together on a horizontal movement of the molds toward each other, and means for swinging said molds on their pivotal connections and sliding them conjointly with the supports.

5. An apparatus for making a hollow glass block or like article formed of sections joined together comprising a pair of molds for forming the article sections, said molds being normally arranged side by side in horizontally spaced relationship, supporting means mounting the molds for swinging movements to spaced substantially parallel vertical positions and return to normal positions therefrom and also mounting said molds in their spaced parallel vertical positions for sliding travel toward and from each other, and mechanism for so swinging and sliding the molds including power operated means and combined reciprocatory and swinging motion transmitting elements disposed between and connecting the same with the molds.

6. An apparatus for making a hollow glass block or like article formed of sections joined together comprising a pair of molds for forming the article sections, said molds being normally arranged side by side in horizontally spaced relationship, normally spaced sliding mold supporting members slidable toward and from each other, means pivotally connecting adjacent sides of the molds to the sliding supporting members to adapt the molds to be swung from their normal positions to substantially parallel vertical positions and to rest upon and to be supported by and for sliding travel in such positions with said supporting members, and mechanism for swinging the molds and sliding the molds and supporting members including power operated means and combined reciprocatory and swinging motion transmitting members disposed between and connecting the same with the molds.

7. An apparatus for making a hollow glass block or like article formed of sections welded together comprising a pair of molds having forming cavities therein for the reception of glass charges from which the article sections are to be pressed, said molds being normally arranged horizontally side by side in spaced relation to each other with the mouths of the mold cavities opening through their normally open sides for the reception of the glass charges and the pressing of the same therein, supporting means having slidable means for each mold positioned between the molds and pivotal means interconnecting each mold with its slidable means, and operating means coupled to the molds for swinging them upwardly from their horizontal positions to spaced vertical positions and then sliding them toward each other, said operating means being operable to reverse the order of movements of the molds.

8. An apparatus for making a hollow glass block formed of sections welded together comprising a pair of molds having angular forming cavities therein for the reception of glass charges from which the article sections are to be pressed, said molds being normally arranged horizontally side by side in spaced relation to each other with the mouths of the mold cavities opening through their normally upper sides for the reception of the glass charges and the pressing of the same therein, said mold cavities being so arranged that their sides will be inclined to the vertical when the molds are disposed in a vertical position, supporting means pivotally mounting said molds for oscillating movements between their normal horizontal positions and spaced parallel vertical positions and also slidably mounting the molds in their spaced vertical positions for horizontal straight line travel toward and from each other, and operating means coupled to the molds for swinging them upwardly from their horizontal positions to spaced vertical positions and then sliding them toward each other, said operating means being operable to reverse such order of movements of the molds.

9. An apparatus for making a hollow glass block or like article formed of sections having edge portions designed to be welded together comprising a pair of molds having forming cavities therein for the reception of glass charges from which the article sections are to be pressed, said molds being normally arranged horizontally side by side in spaced relation to each other with the mouths of the mold cavities opening through their normally upper sides for the reception of the glass charges and the pressing of the same therein, supporting means pivotally mounting the molds for oscillating movements between their normal horizontal positions and spaced parallel vertical positions and also slidably mounting the molds in their spaced vertical positions for horizontal straight line travel toward and from each other, guiding means for guiding the molds in both their swinging and sliding movements, and reciprocatory and swinging power operated means connected to the molds for swinging the molds upwardly from their horizontal positions to spaced vertical positions and then sliding them toward each other, said means being operable to reverse such order of movements of the molds.

JOSIAH H. WILLIAMS.